(12) United States Patent
Demirors et al.

(10) Patent No.: US 6,441,090 B1
(45) Date of Patent: Aug. 27, 2002

(54) HIGH GLOSS HIGH IMPACT MONOVINYLIDENE AROMATIC POLYMERS

(75) Inventors: Mehmet Demirors; David Schrader; Steven M. Black, all of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/423,027

(22) PCT Filed: Aug. 7, 1998

(86) PCT No.: PCT/US98/16500

§ 371 (c)(1),
(2), (4) Date: Oct. 28, 1999

(87) PCT Pub. No.: WO99/09080

PCT Pub. Date: Feb. 25, 1999

Related U.S. Application Data

(60) Provisional application No. 60/055,507, filed on Aug. 13, 1997.

(51) Int. Cl.$^7$ .............................................. C08F 279/02

(52) U.S. Cl. .............................. 525/71; 525/89; 525/98; 525/99

(58) Field of Search .............................. 525/89, 98, 99, 525/71

(56) References Cited

FOREIGN PATENT DOCUMENTS

| EP | 0277687 | * | 8/1988 |
|----|---------|---|--------|
| EP | 0418042 | * | 3/1991 |

* cited by examiner

*Primary Examiner*—Jeffrey Mullis

(57) ABSTRACT

The present invention is a rubber modified monovinylidene aromatic polymer having a bimodal particle size distribution comprising: a) rubber particles of a star or branched low viscosity rubber having a volume average particle size of from 0.1 to 2$\mu$, and a cellular or core shell morphology or mixture thereof, and b) rubber particles of a star or branched low viscosity rubber, linear diene rubber or block copolymer rubber having a volume average particle size of from 0.5 to 10$\mu$, characterized in that the rubber particles of b) are more dense than the rubber particles of a), having a smaller occluded monovinylidene aromatic polymer content than the particles of a), wherein the particles of a) are from 50 to 99 weight percent of the total diene rubber content

25 Claims, No Drawings

HIGH GLOSS HIGH IMPACT MONOVINYLIDENE AROMATIC POLYMERS

This application claims the benefit of provisional application No. 60/055,507 filed on Aug. 13, 1997.

The present invention relates to rubber modified monovinylidene aromatic polymers, particularly polymers containing two distinct rubber volume average particle sizes, herein referred to as bimodal compositions, and a process for preparing.

Rubber modified monovinylidene aromatic polymers have typically been prepared from vinyl aromatic monomers by polymerizing the vinyl aromatic monomer in the presence of a dissolved rubber. The vinyl aromatic monomer polymerizes, forming a discontinuous phase dispersed throughout a continuous phase of dissolved rubber in monomer. As the vinyl aromatic monomer continues to polymerize, the discontinuous polymer phase becomes larger in volume, thus forming a continuous phase, while the rubber forms a discontinuous phase dispersed throughout. This phenomenon, referred to as "phase inversion", is, therefore, the conversion of the polymer from a discontinuous phase dispersed in the continuous phase of the rubber/monomer solution, through the point where there is no distinct continuous or discontinuous phase in the polymerization mixture, to a continuous polymer phase having the rubber dispersed throughout.

Various bimodal compositions containing two distinct rubber particle sizes have been produced to attempt to effectively balance and achieve high gloss, while maintaining high impact properties using several types of rubbers. U.S. Pat. No. 4,334,039 issued to Dupree et al. and U.S. Pat. No. 4,153,645 issued to Lanza et al. disclose the use of butadiene rubbers to obtain polymers having a bimodal rubber particle size distribution. Such polymers, while having good toughness, do not have the desired level of gloss. EP-048,389 by Echte discloses the use of styrene/butadiene block copolymer rubbers wherein small particles are made from a 40/60 styrene/butadiene block copolymer and are of core-shell type morphology. While such products have the desired balance of gloss and impact, they are economically disadvantageous because of higher cost due to the use of the block copolymer rubbers. Additionally, higher amounts of block copolymer must be used in order to obtain a given polybutadiene level, additionally increasing cost.

It is well known in the art that the balance of gloss and impact strength of high impact monovinylidene aromatic polymers is dependent on rubber particle size, rubber level and flow properties of the product. Typically, smaller rubber particle containing resins have higher gloss and lower impact, while larger rubber particle containing resins have lower gloss and higher impact. Standard rubbers, usually known as butadiene homopolymer type, cannot be sized small enough to make the desired high gloss products. Block copolymers usually lead to small rubber particles but are more expensive. Other approaches have been used to solve the problem of obtaining small particles using polybutadiene rubbers. EP-277,687 discloses a rubber modified polymer containing radial or branched polybutadiene rubber having volume average diameter of 0.1 to 1.2 microns ($\mu$) and rubber particles containing either radial, branched or linear rubber having a volume average particle diameter of from 1 to 5$\mu$. However, while these compositions have high gloss, they do not have sufficient toughness.

Therefore, there remains a need to produce rubber modified monovinylidene aromatic polymers having gloss and impact properties similar to those products which use block copolymer rubbers, but without the high cost of block copolymer rubbers.

The present invention is a rubber modified monovinylidene aromatic polymer having a bimodal particle size distribution comprising:

a) rubber particles of a star or branched low viscosity rubber having a volume average particle size of from 0.1 to 2$\mu$, and a cellular or core shell morphology or mixture thereof, and b) rubber particles of a star or branched low viscosity rubber, linear diene rubber or block copolymer rubber having a volume average particle size of from 0.5 to 10$\mu$, characterized in that the rubber particles of b) are more dense than the rubber particles of a), having a smaller occluded monovinylidene aromatic polymer content than the particles of a), wherein the particles of a) are from 50 to 99 weight percent of the total diene rubber content.

This product has excellent gloss and impact properties. It has the balance of gloss and impact properties of a resin containing block copolymer without the high cost. Such products are highly desirable in replacing higher cost products in injection molding and extrusion applications.

The present invention is related to rubber modified monovinylidene aromatic polymers. The monovinylidene rubber modified polymers are derived from one or more vinyl aromatic monomers. Representative vinyl aromatic monomers include styrene, alkyl substituted styrenes such as alpha-alkyl-styrenes, for example alpha-methylstyrene, alpha-ethylstyrene; ring substituted styrenes, for example vinyltoluene, particularly p-vinyitoluene, o-ethylstyrene and 2,4-dimethylstyrene; ring substituted halostyrenes such as chlorostyrene, and 2,4-dichloro-styrene; styrene substituted with both halo and alkyl groups, such as 2-chloro-4methylstyrene, vinyl anthracene; and mixtures thereof. Preferably styrene and/or alpha-methyl-styrene is used as the vinyl aromatic monomer, with styrene being most preferred.

Comonomers may also be used in combination with the vinyl aromatic monomer, preferably in an amount of up to 40 percent by weight of the polymerizable monomer mixture. Representative comonomers include unsaturated nitriles, such as acrylonitrile; alkyl acrylates and alkyl methacrylates such as methyl methacrylate or n-butylacrylate; ethylenically unsaturated carboxylic acids; and ethylenically unsaturated carboxylic acid derivatives including anhydrides and imides, such as maleic anhydride and N-phenyl maleimide.

The rubber suitable for use to produce rubber particles having a volume average particles size of from 0.1 to 2$\mu$ as recited in a), is a low viscosity rubber having a solution viscosity (5 percent in styrene at 20° C.) in the range 20 to 120 centipoise (cps) and a Mooney viscosity (ML+1, 100° C.) of 30 to 80. Suitable rubbers include both so-called radial or star rubbers having three or more polymer segments bonded to a single polyfunctional element or compound, or a branched rubber having a cis content of less than 75 percent and at least one, or a significant number of subordinate chains of sufficient length such that the viscosity of the rubber is less than the viscosity of a linear polymer of the same monomeric components and same molecular weight. Such rubbers useful in a), typically have a relatively high average molecular weight, a relatively low solution viscosity and a medium to high Mooney viscosity. In general, the solution viscosity for the rubber will be below 120 cps while the Mooney viscosity will be less than 80 cps.

The radial or branched rubber preferably employed in a) of the present invention typically exhibits a second order transition temperature not higher than 0° C., and preferably not higher than −20° C. Suitable rubbers include alkadienes which include 1,3-conjugated dienes such as butadiene, isoprene, chloroprene or piperylene. Most preferred are homopolymers prepared from 1,3-conjugated dienes, with homopolymers of 1,3-butadiene being especially preferred. Alkadiene copolymer rubbers containing small amounts, for example up to 10 or 15 weight percent, of other monomers such as vinyl aromatics can also be employed if the rubbers meet the other qualifications described herein.

Polymers having random branching, as well as methods for their preparation, are known in the art and reference is made thereto for the purpose of this invention. Representative branched rubbers and methods for their preparation are described in Great Britain Patent No.1,130,485 and in *Macromolecules,* Vol. II, No. 5, pg. 8, by R. N. Young and C. J. Felters.

Radial or star polymers, commonly referred to as polymers having designed branching, are conventionally prepared using a polyfunctional coupling agent or a polyfunctional initiator. Methods for preparing star or radial polymers having designed branching are well-known in the art. Methods for preparing a polymer of butadiene using a coupling agent are illustrated in U.S. Pat. Nos. 4,183,877; 4,340,690; 4,340,691 and 3,668,162, whereas methods for preparing a polymer of butadiene using a polyfunctional initiator are described in U.S. Pat. Nos. 4,182,818; 4,264,749; 3,668,263 and 3,787,510.

As known by those skilled in the art, various techniques such as control of the branching and molecular weight control can be used to adjust and tailor these polymers to achieve the necessary solution and Mooney viscosities, as well as the ratio of these two.

The rubber suitable for use to produce the rubber particles having a volume average particle size of 0.5 to 10$\mu$ as recited in b) can be the same rubber as that used to produce the smaller rubber particles as described previously in a), a different rubber, or a mixture thereof. Typically the rubber can be any rubbery polymer which can be dissolved in the vinyl aromatic monomer. Preferred rubbery polymers include a homopolymer or copolymer of an alkadiene or a ethylenepropylene copolymer optionally containing a non-conjugated diene. More preferably, the rubber is a homopolymer of a 1,3-conjugated diene such as butadiene, isoprene, piperylene, and chloroprene, or a copolymer of a conjugated diene with one or more vinyl aromatic monomers such as styrene; alpha, beta-ethylenically unsaturated nitrites such as acrylonitrile; and alpha-olefins such as ethylene or propylene. Most preferred rubbers are homopolymers of 1,3-butadiene and block or random copolymers of at least 30, more preferably from 50 to 90, weight percent 1,3-butadiene and up to 70, more preferably from 5 to 50, weight percent of a vinyl aromatic compound, preferably styrene. The rubber utilized to produce large rubber particles of b) is preferably a polybutadiene. The rubber utilized to produce small rubber particles of a) is preferably a polybutadiene or a poly(butadiene-styrene) block copolymer.

The small rubber particles of a) typically have a core-shell (single, major occlusion) or cellular (multiple minor occlusions) morphology or mixture thereof.

The rubber particles of b) are further characterized in that they have a dense rubber structure when compared to the typical salami structure observed in other products. The average ratio of the monovinylidene aromatic polymer to rubber occlusion content of the rubber particles of b) is less than that of the smaller particles of a), as can be clearly distinguished from an electron micrograph. Typically, the particles of b) have an average monovinylidene aromatic polymer to rubber occlusion content of 0.5 to 3, preferably from 0.5 to 2.8, more preferably from 0.5 to 2.5, while a standard particle type has an average monovinylidene aromatic polymer to rubber occlusion content of typically 3.1 to 6, as in the rubber particles of a). The presence of two types of rubber particles as two separate particle sizes and density lead to rubber particles that have two sets of moduli. Such compositions are able to cause crazing over a extended range of applied stresses leading to a tougher material without significant loss of gloss property.

As used herein, the volume average particle size refers to the diameter of the rubber particles, including all occlusions of vinyl aromatic polymer within the rubber particles. Volume average particle sizes and distributions may be measured using conventional techniques such as a Coulter CounterTM or, transmission electron microscopy image analysis. Large particles are measured using a 50$\mu$ tube and smaller particles are measured by using a 30 micron tube.

The amount of rubber initially dissolved in the vinyl aromatic monomer is dependent on the desired concentration of the rubber in the final rubber-reinforced polymer product, the degree of conversion during polymerization and the viscosity of the solution. The rubber is typically used in amounts such that the rubber-reinforced polymer product contains from 2 to 20 percent, preferably from 3 to 17 percent, and more preferably from 3 to 15 weight percent rubber, based on the total weight of the vinyl aromatic monomer and rubber components, expressed as rubber or rubber equivalent. The term "rubber" or "rubber equivalent" as used herein is intended to mean, for a rubber homopolymer, such as polybutadiene, simply the amount of rubber, and for a block copolymer, the amount of the copolymer made up from monomer which when homopolymerized forms a rubbery polymer, such as for a butadiene-styrene block copolymer, the amount of the butadiene component of the block copolymer.

The polymerization is preferably conducted in one or more substantially linear stratified flow or so-called plug-flow type reactors, as described in U.S. Pat. No. 2,727,884.

The techniques of mass-polymerization and the conditions needed for producing the desired average particle sizes are well known to one skilled in the art.

The temperature at which the polymerization is conducted will vary according to the specific components, particularly initiator, but will generally vary from 60 to 190° C.

Typically, the bimodal composition of the present invention is produced by polymerizing a feed of the desired components and a grafting initiator in a series of reactors, wherein the rubber particles of a) are formed and stabilized within the first reactor, then fed to the top of a second reactor.

A portion of the initial feed is additionally fed into the second reactor, preferably at approximately the midpoint of the reactor, such that the mixing of the polymerization mixture containing the rubber particles of a) are rapidly mixed with the non-polymerized feed in the second reactor and rapid phase inversion of the second feed results in the dense type morphology of the rubber particles of b). To obtain the dense type morphology, the polymerization mixture containing the small particles of a) is mixed with the unpolymerized feed in the second reactor, under conditions such that the resultant mixture of a) and the unpolymerized feed has a solids content of at least 4 to 5 times the rubber content. The size of the large, dense particles of b) can be controlled by controlling the agitation and the solids content in the second reactor as is well known in the art.

The polymerization is preferably conducted in the presence of an initiator, preferably for the particles of a). Suitable initiators include any initiator capable of imparting the desired grafting of polymer to the rubber particle under the conditions of polymerization and accelerating the polymerization of the vinyl aromatic monomer. Representative initiators include peroxide initiators such as peresters, for example tertiary butyl peroxybenzoate and tertiary butyl peroxyacetate, tertiary butyl peroxyoctoate, dibenzoyl peroxide, dilauroyl peroxide, 1,1-bis tertiarybutyl peroxycyclohexane, 1-3-bis tertiarybutylperoxy-3,3,5-trimethyl cyclohexane, and di-cumyl peroxide. Photochemical initiation techniques can be employed if desired. Preferred initiators include tertiary butyl peroctoate, tertiary butyl isopropyl percarbonate, dibenzoyl peroxide, tertiary butyl peroxy benzoate, 1,1-bistertiarybutylperoxy cyclohexane and tertiarybutylperoxy acetate.

Initiators may be employed in a range of concentrations dependent on a variety of factors including the specific initiators employed, the desired levels of polymer grafting and the conditions at which the mass polymerization is conducted. Specifically, initiators may be employed in amounts from 0 to 2000, preferably from 100 to 1500, parts by weight per million parts by weight of vinyl aromatic monomer.

Additionally, a solvent may be used in the polymerization. Acceptable solvents include normally liquid organic materials which form a solution with the rubber, vinyl aromatic monomer and the polymer prepared therefrom. Representative solvents include aromatic and substituted aromatic hydrocarbons such as benzene, ethylbenzene, toluene, xylene or the like; substituted or unsubsttuted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane;. Preferred solvents include substituted aromatics, with ethylbenzene and xylene being most preferred. In general, the solvent is employed in amounts sufficient to improve the processability and heat transfer during polymerization. Such amounts will vary depending on the rubber, monomer and solvent employed, the process equipment and the desired degree of polymerization. If employed, the solvent is generally employed in an amount of up to 35 weight percent, preferably from 2 to 25 weight percent, based on the total weight of the solution.

Other materials may also be present in the process of the present invention, including plasticizers, for example mineral oil; flow promoters, lubricants, antioxidants, catalysts, mold release agents, or polymerization aids such as chain transfer agents, including alkyl mercaptans, for example n-dodecyl mercaptan. If employed, a chain transfer agent can be present in an amount of from 0.001 to 0.5 weight percent based on the total weight of the polymerization mixture to which H is added.

Crosslinking of the rubber in the resulting product and removal of the unreacted monomers, as well as any solvent, if employed, and other volatile materials is advantageously conducted employing conventional techniques, such as introducing the polymerization mixture into a devolatilizer, flashing off the monomer and other volatiles at elevated temperature, for example from 200 to 300° C. under vacuum and removing them from the devolatilizer.

In bimodal compositions, two distinct volume average particle sizes are produced and combined. In particular, the rubber particles have different volume average particle sizes, wherein one contains small rubber particles of cellular, core-shell or mixture thereof, having a volume average particle size of from 0.1 to 2 micrometers, and the other contains large dense rubber particles having a volume average particle size of from 0.5 to 10 micrometers.

In bimodal compositions, the desired ratio of the small to large particles is dependent upon the properties desired in the final rubber-reinforced polymer. Typically the amount of small particles ranges from 51 to 99, preferably from 75 to 96, and most preferably from 80 to 95 percent of the total amount of rubber particles in the rubber-reinforced polymer. For products which require high gloss properties, the amount of small particles is from 80 to 98 percent and the amount of large particles is 2 to 20 percent. Other polymers in which higher impact strength is desirable can have 65 to 75 percent small particles and 25 to 35 percent large particles.

In one embodiment of the present invention, a high impact polystyrene (HIPS) composition is produced comprising a polymerized vinyl aromatic monomer, with dispersed particles of rubber having a bimodal particle size distribution. The size of the rubber particles are dependent upon the desired gloss and impact properties of the polymer product. For bimodal HIPS compositions the small rubber particles are typically in the range of from 0.1 to $2\mu$, preferably from 0.2 to 1.5, more preferably from 0.3 to 1.2 and most preferably from 0.3 to $1.1\mu$. The small particles are of cellular type morphology. The ratio of polystyrene occlusion content to polybutadiene is typically 3.1 to 6. The large rubber particles are typically from 0.5 to 10, preferably from 1.0 to 8, more preferably from 1.2 to 7, and most preferably from 1.3 to $6\mu$. The larger rubber particles are denser than the smaller rubber particles, having occluded polystyrene to rubber content of only 0.5 to 3.

Alternatively, the present invention can be an acrylonitrile-butadiene-styrene (ABS) type composition, in which an alkenyl nitrile, generally acrylonitrile is used as a comonomer. For bimodal ABS compositions the small particles are typically in the range of from 0.2 to 1, preferably from 0.3 to 1, more preferably from 0.4 to 0.9 and most preferably from 0.5 to $0.8\mu$ and the large rubber particles are typically from 0.8 to 10, preferably from 0.9 to 6, more preferably from 1 to 4 and most preferably from 1 to $4\mu$.

Due to the excellent balance of gloss and toughness properties, these rubber-reinforced bimodal compositions are useful in a wide variety of applications such as consumer electronics, small household appliances, toys and furniture. These polymers are also useful in extrusion applications such as in the preparation of a gloss layer using coextrusion techniques for refrigerator liners.

As used herein, the volume average particle size refers to the diameter of the rubber particles, including all occlusions of vinyl aromatic polymer within the rubber particles. Volume average particle sizes and distributions may be measured using conventional techniques such as a Coulter Counter™ or, transmission electron microscopy image analysis. Large particles are measured using a $50\mu$ tube.

The following examples are provided to illustrate the present invention. The examples are not intended to limit the scope of the present invention and they should not be so interpreted. Amounts are in parts by weight unless otherwise indicated.

EXAMPLES

Example 1

A feed stream of styrene monomer, HX565 (a low cis star branched rubber available from Bayer AG of Germany), 1000 ppm zinc stearate and 1200 ppm Irganox 1076 is polymerized according to the procedure as disclosed in EP-0096447. The resin is compression molded in order to obtain the physical properties listed below.

Comparative Example 1 is the same as Example 1 except that the rubber is a polybutadiene rubber.

|  | Example 1 | Comparative |
|---|---|---|
| Total Percent Rubber | 10 | 10 |
| Percent rubber as large particles based on total rubber content | 6 | 6 |
| Small Particle Size ($\mu$) | 0.8 | 0.8 |
| Large Particle Size ($\mu$) | 3 | 3 |
| Izod Impact ft.lb./in. (cm.kg./cm.) | 2.3 (12.53) | 1.8 (9.81) |
| Gardner Impact ft.lb. (kg.m.) | 144 (19.87) | 126 (17.39) |
| 60 deg Gardner Gloss (percent) | 93 | 92 |
| 20 deg. Gardner Gloss (percent) | 60 | 45 |

The Izod Impact is measured according to ASTM D-256. The Gardner Impact is measured according to ASTM D3029 and the Garner gloss measurements are obtained according to ASTM D 791.

The larger the difference between the 60 degree gloss and the 20 degree gloss, the more gloss sensitive the material. The Example of the present invention has better impact properties and is less gloss sensitive than the comparative example.

What is claimed is:

1. A rubber modified monovinylidene aromatic polymer having a bimodal particle size distribution comprising:
    a) rubber particles of a star or branched low viscosity rubber, having a solution viscosity (5 percent in styrene at 20° C.) of from 20 to 120 centipoise and a Mooney viscosity (ML+1 at 100° C.) of from 30 to 80 centipoise, a volume average particle size of from 0.1 to 2$\mu$, an average monovinylidene aromatic polymer to rubber occlusion content of from 3.1 to 6, and a cellular or core shell morphology or mixture thereof, and
    b) rubber particles of a star or branched low viscosity rubber, linear diene rubber or block copolymer rubber having a solution viscosity (5 per cent in styrene at 20° C.) of from 20 to 120 centipoise and a Mooney viscosity (ML+1 at 100° C.) of from 30 to 80 centipoise, a volume average particle size of from 0.5 to 10$\mu$, characterized in that the rubber particles of b) are more dense than the particles of a), having an average monovinylidene aromatic polymer to rubber occlusion content of 0.5 to 3,
    wherein the particles of a) are from 50 to 99 wt. % of the total diene rubber content.

2. The composition of claim 1 wherein the rubber of a) is a homopolymer of butadiene.

3. The composition of claim 1 wherein the rubber of b) is a homopolymer of butadiene.

4. The composition of claim 1 wherein the polymer is a HIPS polymer and the rubber particles of a) are from 0.2 to 1.5$\mu$.

5. The composition of claim 4 wherein the rubber particles of a) are from 0.2 to 1.4$\mu$.

6. The composition of claim 5 wherein the rubber particles of a) are from 0.3 to 1.4$\mu$.

7. The composition of claim 1 wherein the polymer is a HIPS polymer and the rubber particles of b) are from 1.0 to 8$\mu$.

8. The composition of claim 7 wherein the rubber particles of b) are from 1.2 to 7$\mu$.

9. The composition of claim 8 wherein the rubber particles of b) are from 1.3 to 6$\mu$.

10. The composition of claim 1 wherein the polymer is an ABS polymer and the rubber particles of a) are from 0.2 to 1$\mu$.

11. The composition of claim 10 wherein the rubber particles of a) are from 0.3 to 1$\mu$.

12. The composition of claim 11 wherein the rubber particles of a) are from 0.4 to 0.9$\mu$.

13. The composition of claim 12 wherein the rubber particles of a) are from 0.4 to 0.8$\mu$.

14. The composition of claim 1 wherein the polymer is an ABS polymer and the rubber particles of b) are from 0.8 to 10$\mu$.

15. The composition of claim 14 wherein the rubber particles of b) are from 0.9 to 6$\mu$.

16. The composition of claim 15 wherein the rubber particles of b) are from 0.9 to 4$\mu$.

17. The composition of claim 16 wherein the rubber particles of b) are from 1 to 4$\mu$.

18. The composition of claim 1 wherein the rubber particles of a) have a core shell morphology.

19. The composition of claim 1 wherein the rubber particles of a) have a cellular morphology.

20. The composition of claim 1 wherein the rubber particles of a) have a mixture of core shell and cellular morphology.

21. A process for producing the polymer of claim 1 comprising:
    A) polymerizing a polymerization mixture (1) comprising vinyl aromatic monomer and dissolved star or branched low viscosity rubber into a first reactor, such that rubber particles having a volume average particle size of from 0.1 to 2$\mu$ and a cellular or core shell morphology or mixture thereof and an occluded monovinylidene aromatic polymer to rubber content of 3.1 to 6, are produced within a partially polymerized polymer matrix,
    B) mixing the product of A) with a polymerization mixture (2) comprising vinyl aromatic monomer and dissolved star or branched low viscosity rubber, linear diene rubber or block copolymer rubber, under conditions such that the resultant mixture has a solids content of at least 4 times the total rubber content of the mixture, and large dense particles are produced having a volume average particle size of from 0.5 to 10$\mu$ and an average monovinylidene aromatic polymer to rubber occlusion content of from 0.5 to 3, and
    C) further polymerizing the product of B) to produce a rubber modified monovinylidene aromatic polymer having a bimodal particle distribution.

22. The process of claim 21 wherein polymerization mixture (1) further comprises an initiator.

23. The process of claim 22 wherein the initiator is selected from the group consisting of tertiary butyl peroctoate, tertiary butyl perbenzoate and bis(ditertiary butyl peroxy) cyclohexamoate.

24. The process of claim 21 wherein polymerization mixture (1) further comprises a chain transfer agent.

25. The process of claim 24 wherein the chain transfer agent is n-dodecyl mercaptan.

* * * * *